US009280437B2

(12) United States Patent
Malhotra et al.

(10) Patent No.: US 9,280,437 B2
(45) Date of Patent: Mar. 8, 2016

(54) DYNAMICALLY SCALABLE REAL-TIME SYSTEM MONITORING

(71) Applicant: Bank of America Corporation, Charlotte, NC (US)

(72) Inventors: Sameer Malhotra, Short Hills, NJ (US); Nazario Parsacala, Piscataway, NJ (US); Rejith Gopalakrishna Kurup, Morganville, NJ (US)

(73) Assignee: Bank of America Corporation, Charlotte, NC (US)

( * ) Notice: Subject to any disclaimer, the term of this patent is extended or adjusted under 35 U.S.C. 154(b) by 262 days.

(21) Appl. No.: 13/682,143

(22) Filed: Nov. 20, 2012

(65) Prior Publication Data

US 2014/0143406 A1   May 22, 2014

(51) Int. Cl.
*G06F 15/173* (2006.01)
*G06F 11/34* (2006.01)
*G06F 11/30* (2006.01)

(52) U.S. Cl.
CPC ........ *G06F 11/3452* (2013.01); *G06F 11/3065* (2013.01); *G06F 11/3096* (2013.01); *G06F 11/3409* (2013.01); *G06F 11/3466* (2013.01); *G06F 11/3495* (2013.01); *G06F 2201/81* (2013.01)

(58) Field of Classification Search
CPC ............ G06F 11/3495; G06F 11/3409; G06F 11/3065; G06F 11/3452; G06F 11/3096; H04L 41/5003

USPC .......................... 709/223, 224, 202; 370/252; 340/286.02, 506

See application file for complete search history.

(56) References Cited

U.S. PATENT DOCUMENTS

| 6,738,813 | B1 * | 5/2004 | Reichman ..................... 709/224 |
| 7,079,010 | B2 * | 7/2006 | Champlin ................ 340/286.02 |
| 7,509,343 | B1 * | 3/2009 | Washburn et al. | |
| 7,599,308 | B2 * | 10/2009 | Laver et al. .................... 370/252 |
| 2007/0093986 | A1 * | 4/2007 | Armstead et al. ............. 702/182 |
| 2008/0155089 | A1 * | 6/2008 | Hunt et al. .................... 709/224 |
| 2009/0164550 | A1 * | 6/2009 | Rahrer et al. ................. 709/202 |
| 2009/0182866 | A1 * | 7/2009 | Watanabe et al. ............. 709/224 |

* cited by examiner

*Primary Examiner* — David Lazaro
*Assistant Examiner* — Zi Ye
(74) *Attorney, Agent, or Firm* — Banner & Witcoff, Ltd.; Michael A. Springs

(57) ABSTRACT

Methods, computer readable media, and apparatuses for dynamically scalable real-time system monitoring are presented. For example, according to one aspect, multiple performance metrics are received from multiple performance metric collection agents. At least some of the performance metrics are identified based on an association with a common entity. The identified performance metrics are utilized to evaluate whether performance conditions specified by rules associated with the common entity have been satisfied. Responsive to evaluating that a performance condition has been satisfied, an alert is generated and communicated to one or more subscriber devices associated with the common entity.

14 Claims, 5 Drawing Sheets

DYNAMICALLY SCALABLE REAL-TIME SYSTEM MONITORING

BACKGROUND

System monitoring is increasingly being utilized by information technology professionals and application developers, for example, to mitigate system failures, increase overall performance, and balance loads across resources. Many moderns systems are designed in a distributed manner. While distributed systems may provide increased scalability and redundancy, they also present complications with respect to system monitoring. For example, utilizing conventional approaches to system monitoring within a distributed system may require extensive and unnecessary system calls. Accordingly, a need exists for dynamically scalable real-time system monitoring.

SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to dynamically scalable real-time system monitoring. In some embodiments, multiple performance metrics may be received from multiple performance metric collection agents. At least some of the performance metrics may be identified based on an association with a common entity. The identified performance metrics may be utilized to evaluate whether performance conditions specified by rules associated with the common entity have been satisfied. Responsive to evaluating that a performance condition specified by the rules associated with the common entity has been satisfied, an alert may be generated and communicated to one or more subscriber devices associated with the common entity.

In some embodiments, the rules associated with the common entity may be application specific and the common entity may correspond to an application hosted by multiple servers. Each of the servers may be associated with one or more of the performance metric collection agents. Additionally or alternatively, the common entity may correspond to a server platform that includes multiple servers and the rules associated with the common entity may be server specific. Each of the servers may be associated with one or more of the performance metric collection agents.

In some embodiments, each of the performance metric collection agents may correspond to an application installed on a server. The application may be configured to collect the performance metrics from the server and communicate the performance metrics to a common message bus. Each of the performance metric collection agents may utilize the common message bus. The performance metrics may include processor utilization of the server, memory utilization of the server, or disk utilization of the server. Communicating the alert to the one or more subscriber devices may include publishing the alert to the common message bus.

In some embodiments, one or more of the performance conditions specified by the rules associated with the common entity may include a dynamic threshold. The dynamic threshold may be a function of present performance versus historical performance.

In some embodiments, a performance metric collection agent discovery service may communicate with each of the performance metric collection agents. For example, the performance metric collection agent discovery service may communicate: a list of performance metrics to collect; an interval specifying a frequency at which the list of performance metrics should be collected; and an interval specifying a frequency at which the list of performance metrics should be communicated to a common message bus.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
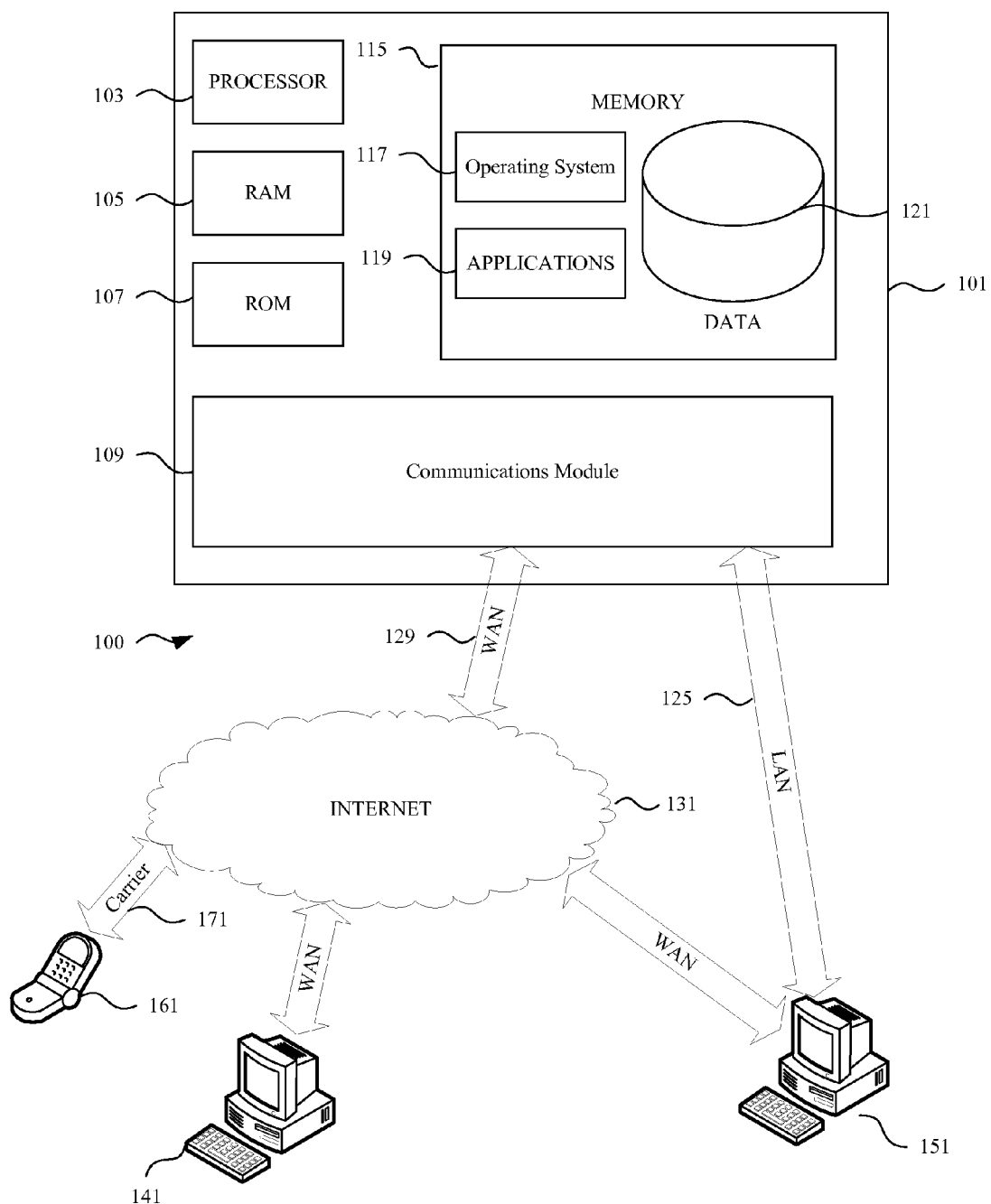
FIG. 1 depicts an illustrative operating environment in which various aspects of the present disclosure may be implemented in accordance with example embodiments.

FIG. 1 depicts an illustrative operating environment in which various aspects of the present disclosure may be implemented in accordance with example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. It will be appreciated that the network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
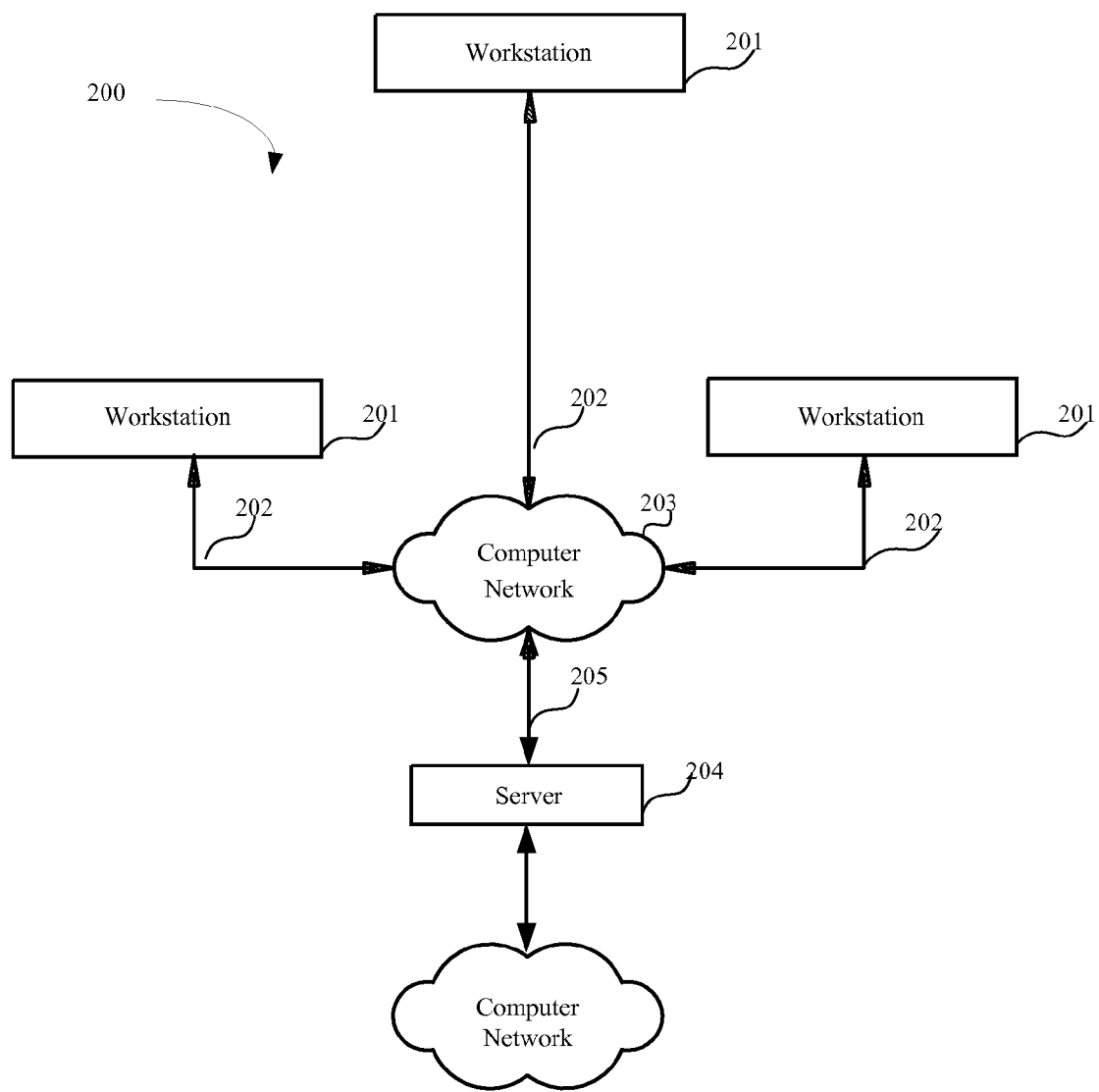
FIG. 2 depicts an illustrative block diagram of workstations and servers that may be used to implement the processes and functions of certain aspects of the present disclosure in accordance with example embodiments.

FIG. 2 depicts an illustrative block diagram of workstations and servers that may be used to implement the processes and functions of certain aspects of the present disclosure in accordance with example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3A:
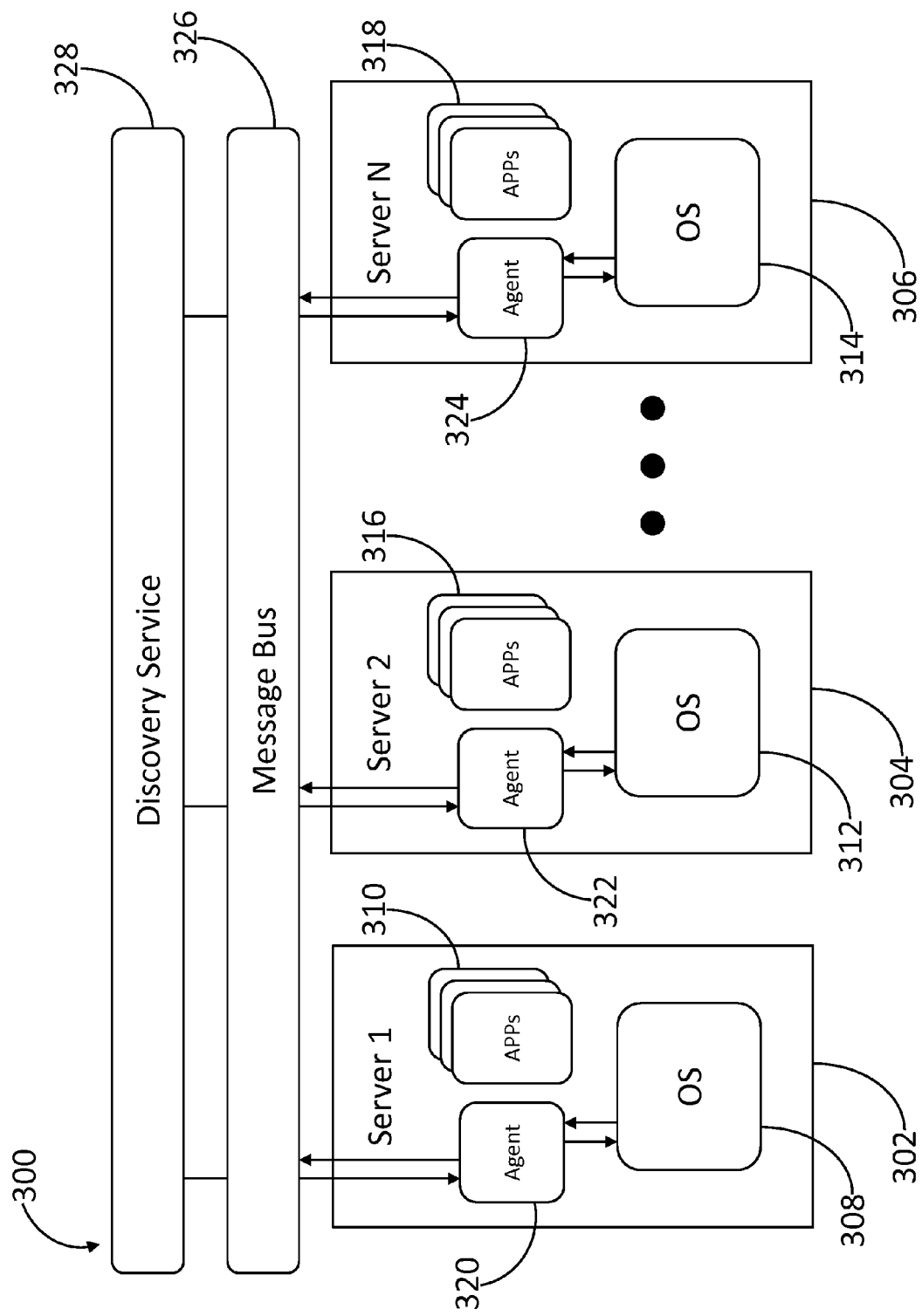
FIG. 3A and FIG. 3B illustrate an example system for providing dynamically scalable real-time system monitoring in accordance with example embodiments.
Figure 3B:
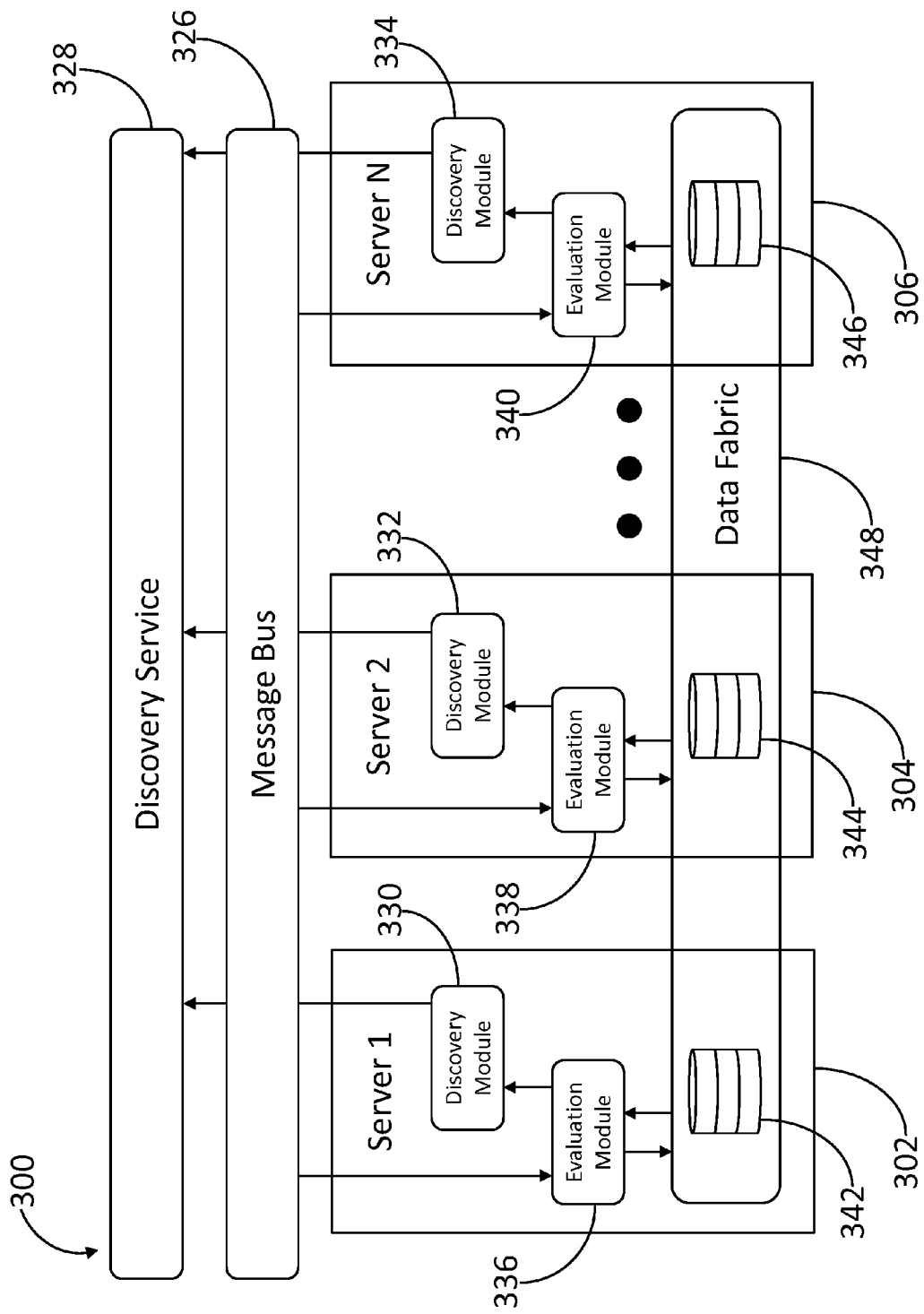

FIG. 3A and FIG. 3B illustrate an example system for providing dynamically scalable real-time system monitoring in accordance with example embodiments. Referring to FIG. 3A, computing environment 300 may include one or more servers. For example, computing environment 300 may include server "1" 302 and server "2" 304 through server "N" 306. Server "1" 302 may run operating system (OS) 308 and one or more applications 310. Similarly, server "2" 304 through server "N" 306 may respectively run OS 312 and OS 314 and one or more applications 316 and one or more applications 318. Server "1" 302 and server "2" 304 through server "N" 306 may constitute or form a portion of a distributed system. For example, one or more of applications 310, applications 316, and applications 318 may be a common application that runs on server "1" 302 and server "2" 304 through server "N" 306.

As indicated above, conventional approaches to system monitoring within a distributed system may require extensive and unnecessary system calls. For example, a first common application may be running on each of server "1" 302 and server "2" 304 through server "N" 306. If a first administrator associated with computing environment 300 desires to know the amount of available disk space associated with the first common application, the first administrator may perform (or develop an application to perform) a system call on each of server "1" 302 and server "2" 304 through server "N" 306 that returns a value corresponding to the amount of available disk space on each of server "1" 302 and server "2" 304 through server "N" 306. The first administrator may then aggregate the values returned by each of these system calls and determine an overall amount of available disk space for use by the first common application. Similarly, a second common application may be running on each of server "1" 302 and server "2" 304 and a second administrator associated with computing environment 300 may contemporaneously desire to know the amount of available disk space associated with the second common application. The second administrator may perform (or develop an application to perform) a system call on each of server "1" 302 and server "2" 304 that returns a value corresponding to the amount of available disk space on each of server "1" 302 and server "2" 304. The second administrator may then aggregate the values returned by each of these system calls and determine an overall amount of available disk space for use by the second common application. As will be appreciated, if the system calls associated with the first common application and the system calls associated with the second common application are performed on server "1" 302 and server "2" 304 contemporaneously, the values returned to the first administrator and the second administrator may be substantially the same, and one of the system calls performed on server "1" 302 and one of the system calls performed on server "2" 304 may be considered redundant. As will be further appreciated, as computing environment 300 scales and the number of applications, administrators, and system calls increases, the number of redundant system calls will correspondingly increase.

Moreover, such an approach to system monitoring may not be dynamic. For example, if an administrator associated with computing environment 300 desires to know the amount of memory being utilized by a common application running on server "1" 302 and server "2" 304 through server "N" 306, the administrator may perform (or develop an application to perform) a system call on each of server "1" 302 and server "2" 304 through server "N" 306 that returns a value corresponding to the amount of memory being utilized by the common application on each of server "1" 302 and server "2" 304 through server "N" 306. The administrator may aggregate the values returned by each of these system calls and determine an overall memory utilization for the common application. If, however, one or more of server "1" 302 and server "2" 304 through server "N" 306 is added to the group of servers running the common application, the administrator may have to note the addition of the server (or alter any specially developed application), so that any subsequent request pertaining to the common application's memory utilization includes performing a system call on the additional server and aggregating the additional returned value. Similarly, if one or more of server "1" 302 and server "2" 304 through server "N" 306 is removed from the group of servers running the common application, the administrator may have to note the removal of the server (or alter any specially developed application), so that any subsequent request pertaining to the common application's memory utilization will not include performing a system call on the removed server and/or aggregating the additional returned value.

In accordance with aspects of the disclosure, a performance metric collection agent may be associated with one or more of server "1" 302 and server "2" 304 through server "N" 306. In some embodiments, the performance metric collection agent may be an application installed on one or more of server "1" 302 and server "2" 304 through server "N" 306. For example, performance metric collection agent 320 may be installed on server "1" 302. Similarly, performance metric collection agent 322 may be installed on server "2" 304 and performance metric collection agent 324 may be installed on server "N" 306. In accordance with aspects of the disclosure, such a performance metric may be configured to collect one or more performance metrics from the server it is associated with (e.g., by performing one or more system calls). For example, performance metric collection agent 320 may be configured to collect one or more performance metrics associated with server "1" 302. Similarly, performance metric collection agent 322 may be configured to collect one or more performance metrics associated with server "2" 304 and performance metric collection agent 324 may be configured to collect one or more performance metrics associated with server "N" 306. Performance metrics may include, for example, processor utilization of the server, memory utilization of the server, and disk utilization of the server. The aforementioned exemplary performance metrics are for illustrative purposes only; numerous other performance metrics are contemplated (e.g., network utilization, and the like) and are intended to be within the scope of the disclosure. One or more performance metrics collected, may be collected on an application specific basis. For example, processor utilization associated with a specific application running on the server, memory utilization associated with a specific application running on the server, or disk utilization associated with a specific application running on the server.

Performance metrics collected by a performance metric collection agent may be communicated within computing environment 300. For example, computing environment 300 may include message bus 326. Message bus 326 may be, for example, one or more instances of a shared database application and/or interface for interacting with one or more shared databases running on one or more of server "1" 302 and server "2" 304 through server "N" 306. Message bus 326 may support storing information (e.g., within a database associated with message bus 326) by one or more of server "1" 302 and server "2" 304 through server "N" 306 and subsequent retrieval of the information by one or more of server "1" 302 and server "2" 304 through server "N" 306. For example, performance metric collection agent 320 may communicate one or more performance metrics collected from server "1" 302 (e.g., values returned from system calls) to message bus 326. Similarly, performance metric collection agent 322 may communicate one or more performance metrics collected from server "2" 304 to message bus 326 and performance metric collection agent 324 may communicate one or more performance metrics collected from server "N" 306 to message bus 326. Once communicated to message bus 326, such performance metrics may be subsequently retrieved by one or more of server "1" 302 and server "2" 304 through server "N" 306.

Computing environment 300 may also include discovery service 328. As will be described in greater detail below, discovery service 328 may be configured to identify or "discover" one or more performance metric collection agents operating within computing environment 300. For example, discovery service 328 may identify performance metric collection agent 320, performance metric collection agent 322, and performance metric collection agent 324. Discovery service 328 may be configured to communicate to each identified performance metric collection agent a list of performance metrics to collect (e.g., processor utilization, memory utilization, disk utilization). For example, discovery service 328 may communicate a list of performance metrics to collect to each of performance metric collection agent 320, performance metric collection agent 322, and performance metric collection agent 324. Discovery service 328 may also be configured to communicate to each identified performance metric collection agent an interval specifying a frequency at which the list of performance metrics should be collected (e.g., processor utilization every ten milliseconds, memory utilization every second, disk utilization every minute). For example, discovery service 328 may communicate an interval specifying a frequency at which the list of performance metrics should be collected to each of performance metric collection agent 320, performance metric collection agent 322, and performance metric collection agent 324. Discovery service 328 may also be configured to communicate to each identified performance metric collection agent an interval specifying a frequency at which the list of performance metrics should be communicated, for example, to message bus 326 (e.g., processor utilization every second, memory utilization every minute, disk utilization every ten minutes). For example, discovery service 328 may communicate an interval specifying a frequency at which the list of performance metrics should be communicated to message bus 326 to each of performance metric collection agent 320, performance metric collection agent 322, and performance metric collection agent 324. Referring to FIG. 3B, discovery service 328 may be implemented and/or supported by one or more discovery modules running on one or more of server "1" 302 and server "2" 304 through server "N" 306. For example, discovery service 328 may be implemented and/or supported by discovery module 330 on server "1" 302, discovery module 332 on server "2" 304, and discovery module 334 on server "N" 306.

One or more of server "1" 302 and server "2" 304 through server "N" 306 may include a performance metric evaluation module. For example, server "1" 302 may include performance metric evaluation module 336. Similarly, server "2" 304 may include performance metric evaluation module 338 and server "N" 306 may include performance metric evaluation module 340. In accordance with aspects of the disclosure, each of performance metric evaluation module 336, performance metric evaluation module 338, and performance metric evaluation module 340 may be configured to receive one or more performance metrics from one or more of performance metric collection agent 320, performance metric collection agent 322, or performance metric collection agent 324. Such performance metrics may be received, for example, via retrieval from message bus 326. Performance metric evaluation module 336, performance metric evaluation module 338, and performance metric evaluation module 340 may be configured to identify performance metrics received from one or more of performance metric collection agent 320, performance metric collection agent 322, or performance metric collection agent 324 based on an association with a common entity. For example, one or more of the performance metrics received from performance metric collection agent 320, performance metric collection agent 322, or performance metric collection agent 324 may be associated with a specific common application running on one or more of server "1" 302 or server "2" 304 through server "N" 306. Additionally or alternatively, one or more of the performance metrics received from performance metric collection agent 320, performance metric collection agent 322, or performance metric collection agent 324 may be associated with a specific server platform that includes multiple individual servers, which may include one or more of server "1" 302 or server "2" 304 through server "N" 306. A common entity may include any aspect or association shared by one or more of server "1" 302 or server "2" 304 through server "N" 306 (e.g., a common application being run on one or more of server "1" 302 or server "2" 304 through server "N" 306, or the inclusion of one or more of server "1" 302 or server "2" 304 through server "N" 306 as part of a server platform).

As will be described in greater detail below, one or more of performance metric evaluation module 336, performance metric evaluation module 338, or performance metric evaluation module 340 may be configured to utilize the identified performance metrics to evaluate whether one or more performance conditions specified by one or more rules associated with a common entity has been satisfied. Responsive, to evaluating that one or more of the performance conditions specified by the one or more rules associated with the common entity has been satisfied, one or more of performance metric evaluation module 336, performance metric evaluation module 338, or performance metric evaluation module 340 may be configured to generate an alert and communicate the alert to one or more subscriber devices associated with the common entity. For example, in an exemplary scenario, a common application may be running on server "1" 302 and server "2" 304. Discovery service 328 may identify performance metric collection agent 320 and performance metric collection agent 322. Discovery service 328 may communicate a list of performance metrics to collect (e.g., processor utilization, memory utilization, and disk utilization), an interval specifying a frequency at which the performance metrics should be collected (e.g., every minute), and an interval specifying a frequency at which the performance metrics should be communicated (e.g., every five minutes). Performance metric collection agent 320 may collect the performance metrics specified by the list from server "1" 302 at the specified interval and may communicate the collected performance metrics to message bus 326 at the specified interval. Similarly, performance metric collection agent 322 may collect the performance metrics specified by the list from server "2" 304 at the specified interval and may communicate the collected performance metrics to message bus 326 at the specified interval.

An administrator associated with the common application running on server "1" 302 and server "2" 304 may have provisioned performance metric evaluation module 340 with one or more rules associated with the common application. In some embodiments one or more of the rules may be implemented using an event processing language. The rules may include one or more performance conditions (e.g., processor utilization exceeds seventy-five percent, memory utilization exceeds eighty percent, or disk utilization exceeds ninety percent). The rules may further specify one or more alerts that should be generated in response to evaluating that one or more of the performance conditions has been satisfied, and may further specify one or more subscriber devices that such an alert should be communicated to (e.g., one or more devices associated with administrators of the common application). Performance metric evaluation module 340 may retrieve the performance metrics communicated by performance metric collection agent 320 and performance metric collection agent 322, along with other performance metrics (e.g., performance metrics collected by other performance metric collection agents and/or performance metrics that are not associated with the common application) from message bus 326. Performance metric evaluation module 340 may identify the performance metrics collected by performance metric collection agent 320 and performance metric collection agent 322 as being associated with the common application. Performance metric evaluation module 340 may then utilize the identified performance metrics to evaluate the performance conditions specified by the rules associated with the common application running on server "1" 302 and server "2" 304. For example, in some embodiments, performance metric evaluation module 340 may average or total the performance metrics associated with server "1" 302 with those associated with server "2" 304 and determine whether an overall performance metric (e.g., overall processor utilization associated with the common application, overall memory utilization associated with the common application, or overall disk utilization associated with the common application) satisfies one or more of the performance conditions specified by the rule. Responsive to evaluating one or more of the performance conditions as satisfied (e.g., disk utilization exceeds ninety percent), performance metric evaluation module 340 may generate an alert (e.g., disk utilization for servers associated with the common application exceeds ninety percent) and communicate the alert to one or more subscriber devices (e.g., devices associated with one or more administrators of the common application). In some embodiments, performance metric evaluation module 340 may publish the alert to message bus 326 and the subscriber devices may retrieve the alert from message bus 326. For example, one or more administrators associated with the common application may utilize an application configured to periodically retrieve alerts associated with the common application from message bus 326.

One or more of server "1" 302 and server "2" 304 through server "N" 306 may include a persistent data repository. For example, server "1" 302 may include persistent data repository 342. Similarly, server "2" 304 may include persistent data repository 344 and server "N" 306 may include persistent data repository 346. Persistent data repository 342, persistent data repository 344, and persistent data repository 346 may form data fabric 348. Data fabric 348 may be configured to share and/or synchronize data stored within one or more of persistent data repository 342, persistent data repository 344, and persistent data repository 346 across one or more of server "1" 302 and server "2" 304 through server "N" 306. Data stored within data fabric 348 may include, for example, performance metrics collected by one or more of performance metric collection agent 320, performance metric collection agent 322, or performance metric collection agent 324. In some embodiments, collected performance metrics may be stored in data fabric 348 in a simplified form. Data fabric 348 may also include rules provisioned to one or more of performance metric evaluation module 336, performance metric evaluation module 338, or performance metric evaluation module 340, and/or one or more records associating one or more of server "1" 302 and server "2" 304 through server "N" 306 or performance metric collection agent 320, performance metric collection agent 322, or performance metric collection agent 324 with one or more common applications and/or server platforms operating within computing environment 300.

In some embodiments, one or more of performance metric evaluation module 336, performance metric evaluation module 338, or performance metric evaluation module 340 may be provisioned with one or more rules that includes a performance condition having a dynamic threshold. Such a performance condition may specify one or more dynamic thresholds as a function of present performance versus past performance. For example, such a dynamic threshold may specify that the performance condition should be evaluated as satisfied if a present performance metric represents a specified growth relative to a corresponding historical performance metric (e.g., if present disk utilization is twenty-five percent greater than historical disk utilization). Such embodiments, may utilize one or more performance metrics stored in data fabric 348 and/or one or more of persistent data repository 342, persistent data repository 344, or persistent data repository 346 to obtain one or more performance metrics for evaluating such a dynamic threshold (e.g., for obtaining one or more historical performance metrics). It will be appreciated that such functionality may aid an administrator associated with computing environment 300 in identifying potential problems and/or server platforms or applications that may require additional resources. For example, a significant growth in memory utilization associated with an application relative to historical memory utilization associated with the application that follows the release of an update to the application may indicate a memory leak in the application update. Similarly, a steady growth in disk utilization associated with an application, may aid an administrator associated with computing environment 300 in allocating more resources (e.g., disk space) to the application.

As will be appreciated, aspects of the disclosure may be utilized to provide dynamically scalable real-time system monitoring within computing environment 300. For example, one or more of performance metric collection agent 320, performance metric collection agent 322, and performance metric collection agent 324 may be configured to collect performance metrics for a specific OS. As will be appreciated, OS 308, OS 312, and OS 314 may differ from one another, and obtaining one or more performance metrics from one or more of server "1" 302 or server "2" 304 through server "N" 306 may require making one or more system calls respectively specific to OS 308, OS 312, or OS 314. Accordingly, a performance metric collection agent may be developed for each specific OS utilized within computing environment 300. When a server is added to computing environment 300, an appropriate performance metric collection agent (e.g., a performance metric collection agent configured to work with the OS utilized by the server) may be associated with the server. Because each performance metric collection agent, irrespective of the OS of the server it is associated with, may communicate collected performance metrics in a uniform manner via message bus 326, one or more of performance metric evaluation module 336, performance metric evaluation module 338, and performance metric evaluation module 340 may identify performance metrics and utilize the identified performance metrics to evaluate performance conditions in an OS agnostic manner. Moreover, one or more of performance metric evaluation module 336, performance metric evaluation module 338, and performance metric evaluation module 340 may include an application program interface (API) that may be called (e.g., via methods or functions defined by the API) by one or more programming languages utilized within computing environment 300. Application developers associated with computing environment 300 may utilize such an API to incorporate performance metrics collected by one or more of performance metric collection agent 320, performance metric collection agent 322, or performance metric collection agent 324 and/or alerts communicated by performance metric evaluation module 336, performance metric evaluation module 338, or performance metric evaluation module 340 into the logic of applications developed for computing environment 300.

In some embodiments, computing environment 300 may be divided into one or more domains (not illustrated). One or more servers and associated performance metric collection agents and/or one or more performance metric evaluation modules may be associated with one or more of the domains. For example, computing environment 300 may correspond to an international corporation's computing environment. Server "1" 302 and server "2" 304 may be associated with a first geographic region and server "N" 306 may be associated with a second geographic region. Computing environment 300 may be divided into domains corresponding to the first geographic region and the second geographic region. Accordingly, performance metric collection agent 320, performance metric collection agent 322, performance metric evaluation module 336, and performance metric evaluation module 338 may be associated with the first domain. Similarly, performance metric collection agent 324 and performance metric evaluation module 340 may be associated with the second domain. It will be appreciated that the aforementioned example is merely illustrative and the manner in which computing environment 300 may divided into multiple domains may be highly dependent on organizational constraints and demands.

Figure 4:
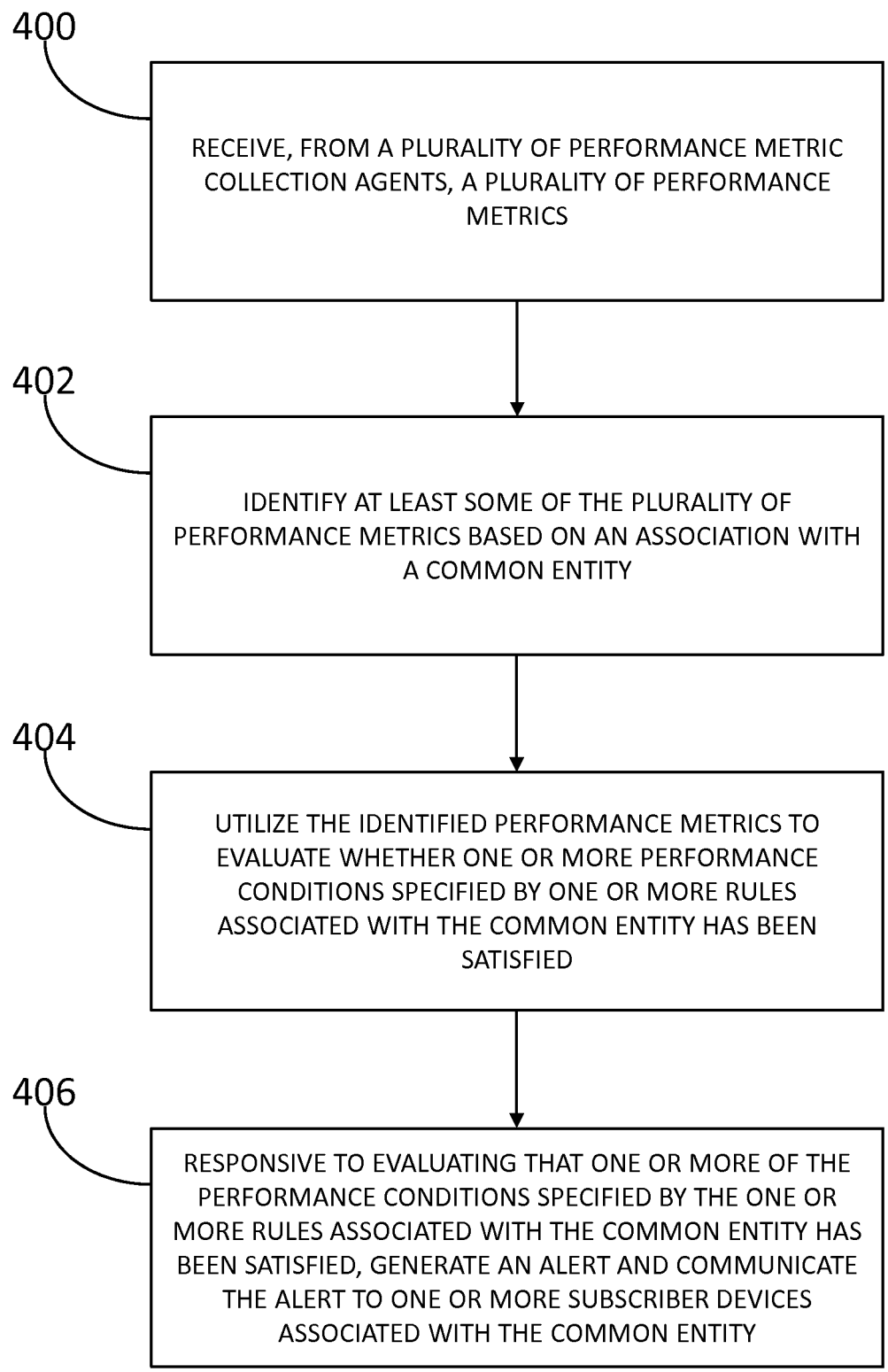
FIG. 4 depicts an example flow diagram of a method in accordance with example embodiments.

FIG. 4 depicts an example flow diagram of a method in accordance with example embodiments. The method may be performed by at least one apparatus such as, for example, a computer, server, or other computational device. For example, the method may be implemented by a single apparatus (e.g., computer) performing the functions of performance metric evaluation module 340. The method may also be implemented using two or more devices (e.g., two or more processors, systems, apparatuses, and the like). The order of the blocks shown in FIG. 4 is an example. The blocks may be arranged in other orders, each function described in each block may be performed one or more times, some blocks may be omitted, and/or additional blocks may be added. The method may begin at step 400.

At step 400, a plurality of performance metrics may be received from a plurality of performance metric collection agents. For example, performance metric evaluation module 340 may retrieve performance metrics from message bus 326 that were communicated to message bus 326 by one or more of performance metric collection agent 320, performance metric collection agent 322, and performance metric collection agent 324. At step 402, at least some of the plurality of performance metrics may be identified based on an association with a common entity. For example, one or more of the performance metrics retrieved by performance metric evaluation module 340 from message bus 326 may be associated with a common application running on one or more of server "1" 302 or server "2" 304 through server "N" 306, and performance metric evaluation module 340 may identify the performance metrics associated with the common application based on their association with the common application. At step 404, the identified performance metrics may be utilized to evaluate whether one or more performance conditions specified by the one or more rules associated with the common entity has been satisfied. For example, performance metric evaluation module 340 may have been provisioned with one or more rules associated with the common application, and may evaluate whether a performance condition specified by the one or more rules has been satisfied using the identified performance metrics associated with the common application. At step 406, responsive to evaluating that one or more of the performance conditions specified by the one or more rules associated with the common entity has been satisfied, an alert may be generated and communicated to one or more subscriber devices associated with the common entity. For example, responsive to performance metric evaluation module 340 evaluating that one or more performance conditions specified by the one or more rules associated with the common application has been satisfied, performance metric evaluation module 340 may generate an alert and communicate the alert to message bus 326, from which one or more administrators associated the common application may subsequently retrieve the alert.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid state memory, RAM, and the like. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more transitory or non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system comprising:
   at least one processor; and
   at least one memory storing instructions that when executed by the at least one processor cause the system to:

for each server of a server platform comprising a plurality of servers executing different operating systems and a common application:
identify, via a discovery service of the system, a performance-metric-collection agent running on the server and configured to make one or more system calls specific to an operating system of the server to retrieve a plurality of performance metrics associated with the common application;
communicate, for each performance metric of the plurality of performance metrics associated with the common application, via the discovery service of the system, and to the performance-metric-collection agent running on the server, an interval specifying a frequency at which the performance metric should be collected from the server by the performance-metric-collection agent running on the server and an interval specifying a frequency at which the performance metric should be communicated by the performance-metric-collection agent running on the server to a common message bus comprising a shared database running on the plurality of servers executing the different operating systems and the common application, the shared database comprising a plurality of persistent data repositories running on each of the plurality of servers; and
receive, for each performance metric of the plurality of performance metrics associated with the common application, via the common message bus comprising the shared database running on the plurality of servers executing the different operating systems and the common application, from the performance-metric-collection agent running on the server, and at the interval specifying the frequency at which the performance metric should be communicated by the performance-metric-collection agent running on the server to the common message bus comprising the shared database running on the plurality of servers executing the different operating systems and the common application, the performance metric as collected by the performance-metric-collection agent running on the server at the interval specifying the frequency at which the performance metric should be collected from the server by the performance-metric-collection agent running on the server;
identify the plurality of performance metrics based on their association with the common application;
determine, based on the plurality of performance metrics associated with the common application and historical performance metrics associated with the common application and stored in the shared database across a data fabric of the server platform comprising the plurality of persistent data repositories and configured to share and synchronize the historical performance metrics across the plurality of servers executing the different operating systems and the common application, that the plurality of performance metrics associated with the common application indicate a growth rate exceeding a dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and
responsive to determining that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application:
generate an alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and
publish, to the common message bus comprising the shared database running on the plurality of servers executing the different operating systems and the common application, for subsequent retrieval by a subscriber device associated with an administrator of the common application and configured to periodically retrieve alerts associated with the common application from the common message bus comprising the shared database running on the plurality of servers executing the different operating systems and the common application, the alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application.

2. The system of claim 1, wherein the instructions, when executed by the at least one processor, cause the system to retrieve, from the common message bus comprising the shared database running on the plurality of servers, the plurality of performance metrics based on their association with the common application.

3. The system of claim 1, wherein the instructions, when executed by the at least one processor, cause the system to:
identify, via the discovery service of the system, a performance-metric-collection agent running on a server added to the server platform comprising the plurality of servers executing different operating systems and the common application; and
for each performance metric of the plurality of performance metrics associated with the common application:

communicate, via the discovery service of the system and to the performance-metric-collection agent running on the server added to the server platform, an interval specifying a frequency at which the performance metric should be collected from the server added to the server platform by the performance-metric-collection agent running on the server added to the server platform and an interval specifying a frequency at which the performance metric should be communicated by the performance-metric-collection agent running on the server added to the server platform to the common message bus comprising the shared database running on the plurality of servers; and receive, via the common message bus comprising the shared database running on the plurality of servers, from the performance-metric-collection agent running on the server added to the server platform, and at the interval specifying the frequency at which the performance metric should be communicated by the performance-metric-collection agent running on the server added to the server platform to the common message bus comprising the shared database running on the plurality of servers, the performance metric as collected by the performance-metric-collection agent running on the server added to the server platform at the interval specifying the frequency at which the performance metric should be collected from the server added to the server platform by the performance-metric-collection agent running on the server added to the server platform.

4. The system of claim 1, wherein a rule associated with the common application identifies the subscriber device associated with the administrator.

5. The system of claim 1, wherein the plurality of performance metrics comprises at least one of processor utilization associated with the common application, memory utilization associated with the common application, disk utilization associated with the common application, or network utilization associated with the common application.

6. A method comprising:
for each server of a server platform comprising a plurality of servers executing different operating systems and a common application:
identifying, by a discovery service of a computing system, a performance-metric-collection agent running on the server and configured to make one or more system calls specific to an operating system of the server to retrieve a plurality of performance metrics associated with the common application;

communicating, for each performance metric of the plurality of performance metrics associated with the common application, via the discovery service of the computing system, and to the performance-metric-collection agent running on the server, an interval specifying a frequency at which the performance metric should be collected from the server by the performance-metric-collection agent running on the server and an interval specifying a frequency at which the performance metric should be communicated by the performance-metric-collection agent running on the server to a common message bus comprising a shared database running on the plurality of servers executing the different operating systems and the common application, the shared database comprising a plurality of persistent data repositories running on each of the plurality of servers; and receiving, for each performance metric of the plurality of performance metrics associated with the common application, via the common message bus comprising the shared database running on the plurality of servers executing the different operating systems and the common application, from the performance-metric-collection agent running on the server, and at the interval specifying the frequency at which the performance metric should be communicated by the performance-metric-collection agent running on the server to the common message bus comprising the shared database running on the plurality of servers executing the different operating systems and the common application, the performance metric as collected by the performance-metric-collection agent running on the server at the interval specifying the frequency at which the performance metric should be collected from the server by the performance-metric-collection agent running on the server;

identifying, by the computing system, the plurality of performance metrics based on their association with the common application;

determining, by the computing system and based on the plurality of performance metrics associated with the common application and historical performance metrics associated with the common application and stored in the shared database across a data fabric of the server platform comprising the plurality of persistent data repositories and configured to share and synchronize the historical performance metrics across the plurality of servers executing the different operating systems and the common application, that the plurality of performance metrics associated with the common application indicate a growth rate exceeding a dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and responsive to determining, by the computing system, that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application:

generating, by the computing system, an alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and publishing, by the computing system, to the common message bus comprising the shared database running on the plurality of servers executing the different operating systems and the common application, for subsequent retrieval by a subscriber device associated with an administrator of the common application and configured to periodically retrieve alerts associated with the common application from the common message bus comprising the shared database running on the plurality of servers executing the different operating systems and the common application, the alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application.

7. The method of claim 6, comprising retrieving, by the computing system and from the common message bus comprising the shared database running on the plurality of servers, the plurality of performance metrics based on their association with the common application.

8. The method of claim 6, comprising:
identifying, by the discovery service of the computing system, a performance-metric-collection agent running on a server added to the server platform comprising the plurality of servers executing different operating systems and the common application; and
for each performance metric of the plurality of performance metrics associated with the common application:
communicating, via the discovery service of the computing system and to the performance-metric-collection agent running on the server added to the server platform, an interval specifying a frequency at which the performance metric should be collected from the server added to the server platform by the performance-metric-collection agent running on the server added to the server platform and an interval specifying a frequency at which the performance metric should be communicated by the performance-metric-collection agent running on the server added to the server platform to the common message bus comprising the shared database running on the plurality of servers; and
receiving, via the common message bus comprising the shared database running on the plurality of servers, from the performance-metric-collection agent running on the server added to the server platform, and at the interval specifying the frequency at which the performance metric should be communicated by the performance-metric-collection agent running on the server added to the server platform to the common message bus comprising the shared database running on the plurality of servers, the performance metric as collected by the performance-metric-collection agent running on the server added to the server platform at the interval specifying the frequency at which the performance metric should be collected from the server added to the server platform by the performance-metric-collection agent running on the server added to the server platform.

9. The method of claim 6, wherein a rule associated with the common application identifies the subscriber device associated with the administrator.

10. The method of claim 6, wherein the plurality of performance metrics comprises at least one of processor utilization associated with the common application, memory utilization associated with the common application, disk utilization associated with the common application, or network utilization associated with the common application.

11. One or more non-transitory computer-readable media having instructions stored thereon that when executed by a computing system cause the computing system to:
for each server of a server platform comprising a plurality of servers executing different operating systems and a common application:
identify, via a discovery service of the system, a performance-metric-collection agent running on the server and configured to make one or more system calls specific to an operating system of the server to retrieve a plurality of performance metrics associated with the common application;
communicate, for each performance metric of the plurality of performance metrics associated with the common application, via the discovery service of the system, and to the performance-metric-collection agent running on the server, an interval specifying a frequency at which the performance metric should be collected from the server by the performance-metric-collection agent running on the server and an interval specifying a frequency at which the performance metric should be communicated by the performance-metric-collection agent running on the server to a common message bus comprising a shared database running on the plurality of servers executing the different operating systems and the common application, the shared database comprising a plurality of persistent data repositories running on each of the plurality of servers; and
receive, for each performance metric of the plurality of performance metrics associated with the common application, via the common message bus comprising the shared database running on the plurality of servers executing the different operating systems and the common application, from the performance-metric-collection agent running on the server, and at the interval specifying the frequency at which the performance metric should be communicated by the performance-metric-collection agent running on the server to the common message bus comprising the shared database running on the plurality of servers executing the different operating systems and the common application, the performance metric as collected by the performance-metric-collection agent running on the server at the interval specifying the frequency at which the performance metric should be collected from the server by the performance-metric-collection agent running on the server;
identify the plurality of performance metrics based on their association with the common application;
determine, based on the plurality of performance metrics associated with the common application and historical performance metrics associated with the common application and stored in the shared database across a data fabric of the server platform comprising the plurality of persistent data repositories and configured to share and synchronize the historical performance metrics across the plurality of servers executing the different operating systems and the common application, that the plurality of performance metrics associated with the common application indicate a growth rate exceeding a dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and responsive to determining that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application:

generate an alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application; and publish, to the common message bus comprising the shared database running on the plurality of servers executing the different operating systems and the common application, for subsequent retrieval by a subscriber device associated with an administrator of the common application and configured to periodically retrieve alerts associated with the common application from the common message bus comprising the shared database running on the plurality of servers executing the different operating systems and the common application, the alert indicating that the plurality of performance metrics associated with the common application indicate the growth rate exceeding the dynamic threshold associated with the common application relative to the historical performance metrics associated with the common application and stored in the shared database across the data fabric of the server platform comprising the plurality of persistent data repositories and configured to share and synchronize the historical performance metrics across the plurality of servers executing the different operating systems and the common application.

12. The one or more non-transitory computer-readable media of claim 11, wherein the instructions, when executed by the computing system, cause the computing system to retrieve, from the common message bus comprising the shared database running on the plurality of servers, the plurality of performance metrics based on their association with the common application.

13. The one or more non-transitory computer-readable media of claim 11, wherein the instructions, when executed by the computing system, cause the computing system to:

identify, via the discovery service of the computing system, a performance-metric-collection agent running on a server added to the server platform comprising the plurality of servers executing different operating systems and the common application; and for each performance metric of the plurality of performance metrics associated with the common application:

communicate, via the discovery service of the computing system and to the performance-metric-collection agent running on the server added to the server platform, an interval specifying a frequency at which the performance metric should be collected from the server added to the server platform by the performance-metric-collection agent running on the server added to the server platform and an interval specifying a frequency at which the performance metric should be communicated by the performance-metric-collection agent running on the server added to the server platform to the common message bus comprising the shared database running on the plurality of servers; and receive, via the common message bus comprising the shared database running on the plurality of servers, from the performance-metric-collection agent running on the server added to the server platform, and at the interval specifying the frequency at which the performance metric should be communicated by the performance-metric-collection agent running on the server added to the server platform to the common message bus comprising the shared database running on the plurality of servers, the performance metric as collected by the performance-metric-collection agent running on the server added to the server platform at the interval specifying the frequency at which the performance metric should be collected from the server added to the server platform by the performance-metric-collection agent running on the server added to the server platform.

14. The one or more non-transitory computer-readable media of claim 11, wherein a rule associated with the common application identifies the subscriber device associated with the administrator.

* * * * *